(12) United States Patent
Tung

(10) Patent No.: US 6,543,897 B1
(45) Date of Patent: Apr. 8, 2003

(54) ORTHOKERATOLOGY CONTACT LENS

(76) Inventor: Hsiao-Ching Tung, 2F, No. 164, Ling Jiang Street, Taipei (TW)

( * ) Notice: Subject to any disclaimer, the term of this patent is extended or adjusted under 35 U.S.C. 154(b) by 45 days.

(21) Appl. No.: 09/715,964

(22) Filed: Nov. 17, 2000

(51) Int. Cl.⁷ .................................................. G02C 7/04

(52) U.S. Cl. ...................................... 351/161; 351/177

(58) Field of Search .................... 351/160 R, 160 H, 351/161, 162, 177

(56) References Cited

U.S. PATENT DOCUMENTS 5,963,297 A * 10/1999 Reim ...................... 351/160 R

* cited by examiner

Primary Examiner—Scott J. Sugarman
(74) Attorney, Agent, or Firm—Birch, Stewart, Kolasch & Birch, LLC; Philip K. Yu

(57) ABSTRACT

A contact lens is fitted to a cornea of a patient's eye to gradually alter the patient's cornea during continued wear to reshape the cornea to reduce the myopic condition. The contact lens has a plurality of zones that includes an optical zone, a fitting zone, one or more facilitate zones, an alignment zone and a peripheral zone. The one or more facilitate zones are utilized to redistribute cornea tissue to cause the cornea to have a flattened central portion surrounded by a steep mid-peripheral ring.

14 Claims, 2 Drawing Sheets

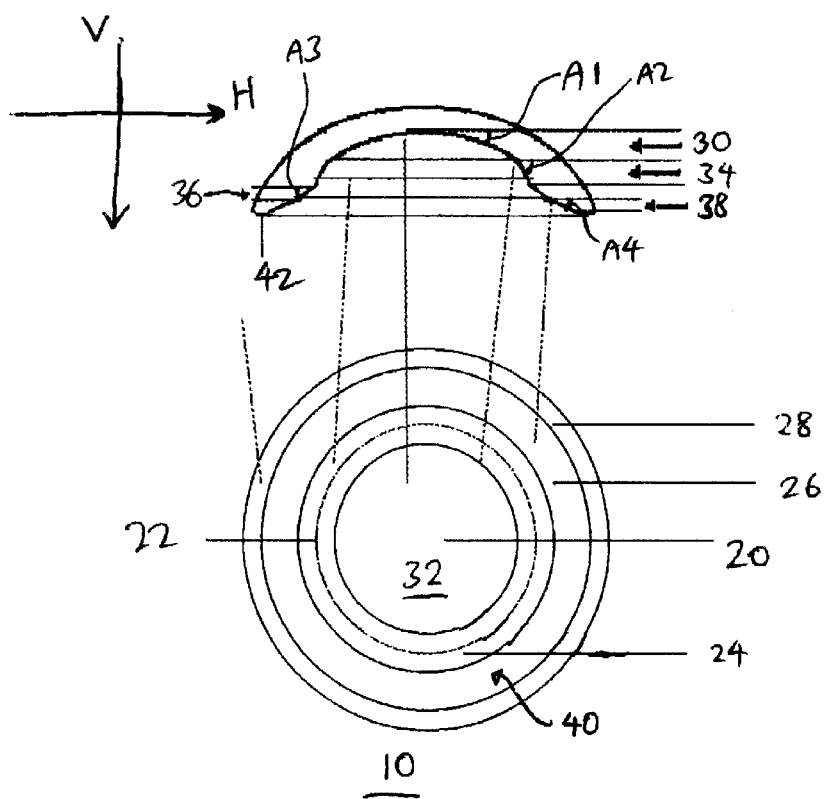
FIG. 3
FIG. 2
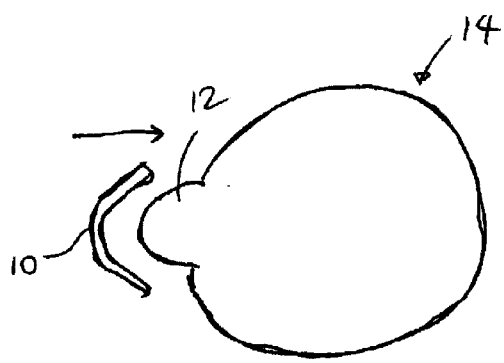
FIG. 1

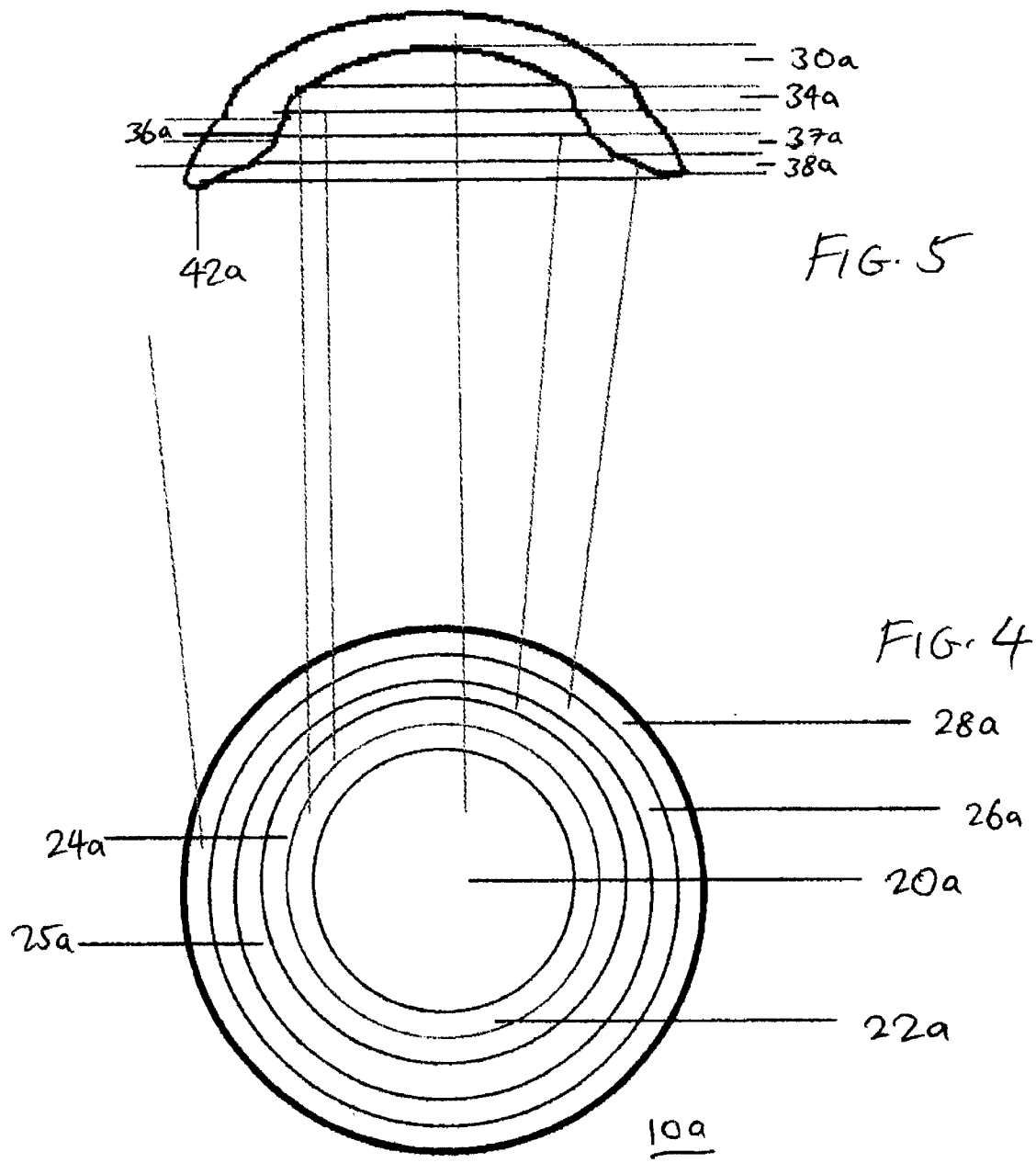

ORTHOKERATOLOGY CONTACT LENS

BACKGROUND OF THE INVENTION

1. Field of the Invention

The present invention relates to contact lenses that are used in treating myopia, and more particularly, to contact lenses that are shaped to provide gradual altering of the patient's cornea during continued wear to reshape the cornea to reduce the myopic condition.

2. Description of the Related Art

Many people experience difficulties with their vision due to a number of possible conditions. The most common vision problem is a condition known as myopia or near-sightedness. Myopia is a common condition where an eye cannot focus on far-away objects because the cornea of the eye is curved too steeply (i.e., where the radius of curvature of the cornea is smaller than normal) to provide adequate focusing at the retina of the eye. Another condition is known as hyperopia or farsightedness. With hyperopia, the eye cannot focus on near objects because the curvature of the cornea of the eye is too flat to provide adequate focusing at the retina of the eye. Another common problem is astigmatism, where unequal curvature of one or more refractive surfaces of the cornea prevents light rays from focusing clearly at one point on the retina, resulting in blurred vision.

Myopia is a condition for which no entirely suitable permanent treatment has been developed. One approach to correcting myopia is through surgical reshaping of the cornea. However, such surgical procedures have not been entirely safe and there is some question; as to the permanency of the surgically altered lens shape.

Another approach to treating some or all of these conditions is to alter the corneal shape by wearing contact lenses which are designed to continually exert pressure on selected locations of the cornea to gradually force or mold the cornea into the desired normal corneal curvature. A retainer lens is then worn on a part-time basis to prevent the cornea from returning to its previously deformed shape. This method of treatment is commonly referred to as orthokeratology (referred to herein as "ortho-k"). The success of any treatment by ortho-k is dependent upon the shape and structure of the contact lens.

For example, conventional contact lenses with a longer central radius of curvature than the central radius of the cornea are known to change the shape of the cornea by compressing the surface at its apex. This reshaped cornea has a lengthened radius of curvature in its central zone, which serves to improve myopia.

Ortho-k has been performed in some form or another since the early 1970s. There are three factors that impact the effectiveness and desirability of ortho-k procedures and lenses. The first factor is the time needed to achieve a desired visual correction. Unfortunately, the time needed to achieve a desired visual correction using known ortho-k techniques and lenses has been a serious problem, although recent efforts have actually reduced this correction time from several years to several months. The second factor is the amount of myopia that can be corrected using ortho-k. Prior known ortho-k techniques and lenses were limited to a reduction of 2 to 5 diopters of myopia. The third factor is the amount of time that the correction would "hold" before degrading (known as the maintenance period). Known ortho-k techniques and lenses were variable in the length of the maintenance period. To prolong this maintenance period, the patient would have to wear a retainer lens.

U.S. Pat. No. 5,963,297 to Reim discloses an ortho-k contact lens having four correction zones, listed from the center of the lens to the outer periphery: an optical zone, a fitting zone, an alignment zone, and a peripheral zone. This patent purports that its ortho-k contact lens provides a number of benefits, which if true, do provide some improvements over the previously available contact lens.

Notwithstanding the improvements provided by U.S. Pat. No. 5,963,297 to Reim, there remains a need for a contact lens that can be used for ortho-k, which provides increased reduction of myopia, requires a shorter correction time, and provides a longer maintenance period.

SUMMARY OF THE INVENTION

It is an object of the present invention to provide an ortho-k contact lens that provides increased reduction of myopia.

It is another object of the present invention to provide an ortho-k contact lens that provides a shorter correction time.

It is yet another object of the present invention to provide an ortho-k contact lens that provides a longer maintenance period.

The objects of the present invention may be achieved by providing an apparatus and method for correcting a myopic condition in a patient's eye. In accordance to a method according to the present invention, a contact lens is fitted to a cornea of a patient's eye, the contact lens having a plurality of zones that includes a facilitate zone. The facilitate zone is utilized to redistribute cornea tissue to cause the cornea to have a flattened central portion surrounded by a steep mid-peripheral ring.

In accordance to an apparatus according to the present invention, a contact lens is provided having a base curve portion of the lens having a longer radius of curvature than a central portion of a cornea, a fitting curve portion of the lens circumscribing and coupled to the base curve portion, a facilitate curve portion of the lens circumscribing and coupled to the fitting curve portion, and an alignment curve portion of the lens circumscribing and coupled to the facilitate curve portion.

BRIEF DESCRIPTION OF THE DRAWINGS

FIG. 1 is a side schematic outline view of an ortho-k contact lens according to the present invention in use with a cornea of a patient's eye.

FIG. 2 is a front planar view of the ortho-k contact lens according to one embodiment of the present invention.

FIG. 3 is a side sectional view of the ortho-k contact lens of FIG. 2.

FIG. 4 is a front planar view of the ortho-k contact lens according to another embodiment of the present invention.

FIG. 5 is a side sectional view of the ortho-k contact lens of FIG. 4.

DESCRIPTION OF THE PREFERRED EMBODIMENTS

The following detailed description is of the best presently contemplated modes of carrying. out the invention. This description is not to be taken in a limiting sense, but is made merely for the purpose of illustrating general principles of embodiments of the invention. The scope of the invention is best defined by the appended claims.

FIGS. 1–3 illustrate an ortho-k contact lens 10 according to one embodiment of the present invention. As shown in FIG. 1, the contact lens 10 is a reverse geometric contact lens that is adapted to be worn over the cornea 12 of a patient's eye 14. The contact lens 10 has five correction zones, listed from the center of the lens 10 to the outer periphery: an optical zone 20, a fitting zone 22, a facilitate zone 24, an alignment zone 26, and a peripheral zone 28.

Optical Zone

The optical zone 20 has a curvature that is defined by the base curve 30. The optical zone 20 applies a primary compressive force to a region substantially centered at the apical center of the cornea 12, and is responsible for the corrective flattening or decrease in the radii of curvature of the central cornea during treatment. The radius of curvature of the base curve 30 is greater than a measured curvature of a central portion of the cornea 12 and creates a central bearing area 32 where a primary compressive force is applied during vision correction. In other words, the curvature of the base curve 30 is less than (flatter than) a measured curvature of the central portion of the cornea 12. In one embodiment of the present invention, the diameter of the optical zone 20 ranges from 3 mm to 10 mm, and the radii of the curvature for the base curve 30 ranges from 15.0 mm to 7.0 mm.

Fitting Zone 22

The fitting zone 22 has a radius of curvature defined by a predefined fitting curve 34, with the radius of curvature being less than (i.e., shorter than) the radius of curvature associated with the base curve 30. This shorter radius of curvature of the fitting zone 22 yields a curvature that is steeper than the measured curvature of the central portion of the cornea 12 and the measured curvature of the portion of the cornea 12 circumscribing the central portion of the cornea 12. The fitting zone 22 and the facilitate zone 24 together act as a transition region between the optical zone 20 and the alignment zone 26. The fitting zone 22 and the facilitate zone 24 bring the posterior surface of the contact lens 10 to a bearing relationship on the central portion of the cornea 12, and provides compression force on the optical zone 20, thereby compressing the central portion of the cornea 12, to mold the cornea 12. In one embodiment of the present invention, the width of the fitting zone 22 ranges from 0.1 mm to 2.0 mm, the radius of curvature for the fitting curve 34 is 12–30 diopters steeper than the base curve 30, and is two to four times steeper (i.e., larger angle A2) than a conventional fitting curve.

At this time, it should be noted that a lens can be calculated from the view point of saggital depth. A saggital depth calculation will translate the component curvatures and each width for a lens into a simple factor known as the saggital depth. A saggital depth will be measured from the center of a lens to the denoted width, and will also define the slope of an area on a lens. In other words, the angles A1, A2, A3 and A4 illustrated in FIG. 3 can be calculated as the "saggital depth/zone width" and can be considered to be a slope ratio, which can be defined as the vertical height/zone width. Since a reverse geometric lens has multiple curvatures, we have to calculate the vertical height of each zone and add them up. Here, the summation of (i) vertical height of the optical zone 20, (ii) the vertical height of the facilitate zone 24, and (iii) the vertical height of the fitting zone 22 should be equal to the height of the original cornea with the same zone width (i.e., the 3 total zones) plus 10 microns (this additional 10 microns is an allowance made to prevent the lens 10 from bearing on the cornea 12). This is the underlying principle of saggital depth calculation. A more detailed explanation of saggital depth calculation is provided in *Advanced CL Fitting; Part Seven, Trends in Modern Orthokeratology,* Optician, No. 5645, Vol. 215, Apr. 3, 1996, pages 20–24, whose entire disclosure is incorporated by this reference as though fully set forth herein.

Facilitate Zone 24

The facilitate zone 24 has a radius of curvature defined by a predefined facilitate curve 36, with the radius of curvature being greater (i.e., flatter) than the radius of curvature associated with the fitting curve 34. This greater radius of curvature of the facilitate zone 24 yields a curvature lesser than the measured curvature of the central portion of the cornea 12 and the measured curvature of the portion of the cornea 12 circumscribing the central portion of the cornea 12. As mentioned above, the facilitate zone 24 functions together with the fitting zone as a transition region between the optical zone 20 and the alignment zone 26.

The facilitate zone 24 can be considered to be a second fitting curve, and performs three primary functions. First, the provision of the facilitate zone 24 allows the slope difference between the optical zone 20 and the fitting zone 22 to be increased. In other words, the fitting zone 22 can now be provided with a curvature that is substantially steeper than the base curve 30, and steeper than a conventional fitting curve, so as to further enhance the functions supposedly performed by the fitting zone 22, and will lessen the amount of cornea tissue redistribution needed to treat high myopia. As a result, the facilitate zone 24 can perform the functions typically performed by a conventional fitting zone.

Second, the facilitate zone 24 functions as a template to facilitate the redistribution of mid-peripheral cornea tissues into the fitting curve 34. This will ease the accumulation of cornea tissue around the central zone of a cornea 12 to provide a more flattened central cornea 12, which in turn will reduce myopia more efficiently. The shape of a flattened central cornea 12 surrounded by a steep mid-peripheral ring is called an ablated cornea which is the effect accomplished by most laser myopia operation procedures. An ortho-k lens will not actually ablate the cornea 12, but the facilitate zone 24 of the present invention will redistribute the corneal tissue efficiently into the shape of an ablation to achieve significant reduction in myopia and to lengthen the maintenance period.

Third, by defining an additional zone, the facilitate zone 24 increases tear circulation and stabilizes the position of the lens 10 so that the lens 10 will center better with less seal-off than conventional ortho-k contact lenses. The facilitate curve 36 provides an additional friction action against the steep mid-peripheral cornea after a short wearing period, which in turn facilitates better centering for the lens 10. For example, it is well-known that a well-centered ortho-k lens is essential for effective myopia reduction. An off-centered lens will tighten up and stick on the peripheral cornea. If the tear film under the lens is dried up, the lens will adhere to the cornea without movement, a phenomenon called "seal-off". In this regard, the facilitate curve 36 forms an additional tear channel to improve tear circulation.

In one embodiment of the present invention, the width of the facilitate zone 24 ranges from 0.1 mm to 2.0 mm, the radius of curvature for the facilitate curve 36 is 2–25 diopters greater than the fitting curve 34. The slope (i.e., angle A3) of the facilitate curve 36 would be between that of the fitting curve 34 (A2) and the alignment curve 38 (A4). The saggital depth ratio of the fitting curve 22 to the facilitate curve 24 can be within a range of 10:1–1:10. Actually, it is possible to provide an ortho-k lens 10 having any saggital depth ratio for the fitting curve 34 and the facilitate curve 36 if the width ratio is adjusted to maintain the fitting curve 34 always smaller (steeper) than the facilitate curve 36.

Although the present invention illustrates the provision of one facilitate curve 36, it is also possible to provide the contact lens 10 with two or more facilitate zones and facilitate curves. FIGS. 4 and 5 illustrate a contact lens 10a that is essentially the same as the contact lens 10, except that two facilitate zones 24a and 25a and two corresponding facilitate curves 36a and 37a are now provided instead of the one facilitate zone 24 and one facilitate curve 36 in FIGS. 2 and 3. Otherwise, the other zones and curves in FIGS. 4 and 5 are the same as the zones and curves in FIGS. 2 and 3, so the same numeral designations are used except that an "a" has been add to the designations in FIGS. 4 and 5. The first (inner) facilitate curve 36a is flatter than the fitting curve 34a by 1–20 diopters, and the second (outer) facilitate curve 37a is further flatter than the first facilitate curve 36a by 1–15 diopters, but the second (outer) facilitate curve 37a is still steeper than the alignment curve 38a by 1–20 diopters. Each facilitate zone 24a and 25a can have a width of 0.1 mm to 2.0 mm. The saggital theory explained above still applies here so that the summation of the saggital depths of the two facilitate zones 24a and 25a should equal the saggital depth of the single facilitate zone 24 in lens 10. In addition, the zone width should be smaller for each facilitate curve 36a, 37a.

More than one facilitate zone 24 and facilitate curve 36 may be necessary to treat higher myopia (e.g., over 10 diopters) or a cornea 12 that is more difficult to mold. The plurality of facilitate zones performs the same functions outlined above for the single facilitate zone 24: (1) facilitate redistribution of peripheral cornea, (2) better centering of the lens 10a, (3) better tear circulation, and (4) acting as a transition region between the base zone 20 and the alignment zone 26.

Alignment Zone 26

The alignment zone 26 is designed to provide and maintain centration of the lens 10 by having a radius of curvature that is either the same as or shorter than the cornea 12 (i.e., to match the peripheral cornea). A predefined alignment curve 38 defines the curvature of the alignment zone 26, which is less than the measured curvature of the portion of the cornea 12 circumscribing the central portion of the cornea 12. The alignment zone 26 creates a large bearing area 40 in a region corresponding with the portion of the cornea 12 where a centering force is created that maintains the optical zone 20 substantially at the apical center of the cornea 12. The alignment zone 26 further produces a secondary compressive force in the large bearing area 40 that cooperates with the primary compressive force to flatten the central portion of the cornea 12 during vision correction.

The alignment curve 38 is determined by mean KM. In other words:

Mean $KM = (\text{Vertical } KM + \text{Horizontal } KM)/2$.

The central mean K in turn will be recalculated to estimate the mid-peripheral radius of curvature according to the eccentricity (e-value) of a cornea to match the point that the alignment zone 26 contacts the cornea 12. This calculation method enjoys two benefits over known methods. First, this calculation method can be used for both toric (astigmatic) or non-toric corneas. Corneas with the same horizontal central KM do not mean they should be fitted with the same ortho-k lens. The vertical curvature could be different (astigmatic or toric cornea), the e-value could also be different, and they should be considered as different corneas. Second, by considering the e-value of a normal cornea, the peripheral attachment of the alignment zone 26 will be improved.

The associated alignment curve 38 creates a bearing zone over a large surface area of the cornea 12, which is helpful in aligning the lens 10 at the apex of the cornea 12. In one embodiment of the present invention, the width of the alignment zone 26 ranges from 0.1 mm to 5.0 mm (depending on the fitting characteristics desired and the particular shape factors of the cornea 12), the radius of curvature for the alignment curve 38 is 1–20 diopters steeper than the base curve 30, and the alignment curve 38 is also about 1–25 diopters less steep (i.e., flatter) than either the fitting curve 34 or the facilitate curve 36.

Alternatively, the alignment zone 26 can be segmented into multiple curves and any combination of any shapes or curves, as long as sufficient bearing area is maintained.

Peripheral Zone 28

The peripheral zone 28 is designed with a radius of curvature longer than that of the cornea 12, yielding a curvature slightly less than a measured curvature of a portion of the cornea 12 circumscribing the central portion of the cornea 12 that corresponds to the alignment zone 26. The peripheral zone 28 has its surface contour defined by a predefined peripheral curve 42 which has a curvature that nearly parallels the portion of the cornea 12 underneath it, but is slightly flatter than the cornea 12. The peripheral zone 28 promotes tear flow under the contact lens 10 by taking advantage of a tear pumping action created when the individual blinks the eyelid. This tear flow allows constant lubrication and oxygenation of the lens-cornea interface and results in a more comfortable and wearable lens 10. Additionally, the peripheral zone 28 is designed to create a slight edge lift which allows easy contact lens removal from the cornea 12. In one embodiment of the present invention, the width of the peripheral zone 28 ranges from 0.1 mm to 2.0 mm, the radius of curvature for the peripheral curve 42 is 0–15 diopters greater (flatter) than the base curve 30, and is also about 1–35 diopters greater than either the fitting curve 34, the facilitate curve 36, or the alignment curve 38. The peripheral curvature should be carefully calculated according to the aforementioned saggital theory to achieve an edge lift of 100–120 microns. An overly-large edge lift may induce a reverse suction force to create air bubbles under the lens 10, while an overly-small edge lift may reduce tear circulation and cause lens seal-off.

The different radii used to define the base curve 30, the fitting curve 34, the facilitate curve 36, the alignment curve 38 and the peripheral curve 42 are calculated after careful examination of the patient's eye and the associated ocular tissue. The corneal curvature must be measured, the proper contact lens power defined, and the anticipated physiological response to the contact lens 10 must be determined. An individual skilled in the examination techniques of the ocular system is typically capable of performing these tasks.

As explained above, the provision of one or more facilitate zones 24, 24a, 25a achieves better centering of the contact lens 10, 10a, and improves the molding or correction of the cornea 12. For example, the contact lens 10 of the present invention can achieve a reduction of myopia up to 10.0 diopters with a shorter wearing time (e.g., 6–10 hours a day for initial wearing, and 4–8 hours a day to maintain) and longer maintenance period (e.g., 1–7 days after the lens 10 is removed).

EXAMPLE 1

A contact lens having the following dimensions were provided for a AA0336 patient:

Right Eye: −8.00 (myopia 8.00D)

optical zone 20: width 5.2 mm, radius of curvature 10.51 mm fitting zone 22: width 0.5 mm, radius of curvature 6.34 mm facilitate zone 24: width 0.5 mm, radius of curvature 7.44 mm alignment zone 26: width 1.0 mm, radius of curvature 8.31 mm peripheral zone 28: width 0.4 mm, radius of curvature 13.3 mm Left Eye: −7.75−1.75@175 (myopia −7.75D and Astigmatism −1.75D axis 175 degrees)

optical zone 20: width 5.2 mm, radius of curvature 10.67 mm fitting zone 22: width 0.5 mm, radius of curvature 6.32 mm facilitate zone 24: width 0.5 mm, radius of curvature 7.43 mm alignment zone 26: width 1.0 mm, radius of curvature 8.38 mm peripheral zone 28: width 0.4 mm, radius of curvature 13.6 mm The contact lenses were worn by a patient for 14 days, at 7–8 hours a day. After this correction period, the patient experienced a myopia reduction to zero power. This is equivalent to a myopia reduction of −8.00D for the right eye and −8.62D (spherical equivalent) for the left eye. The maintenance period (of nearly zero power) lasted for all awakening hours with a 5–7 hour maintenance night wearing. The topography of the cornea is well-centered and has a definite boundary of ablated shape to support an efficient reduction in myopia. This case has been followed for nine months with no side effects.

Although the present invention has been described in connection with the preferred embodiments, it will be appreciated by those skilled in the art that modifications can be made and alternatives utilized without departing from the spirit and scope of the present invention.

What is claimed is:

1. A contact lens, comprising:
   an optical zone having a base curvature less than a measured curvature of a central portion of a cornea;
   a fitting zone coupled to the optical zone and extending radially therefrom, having a fitting curvature that is steeper than said base curvature by about 15–30 diopters;
   a facilitate zone coupled to the fitting zone and extending radially therefrom, having a facilitate curvature that is flatter than said fitting curvature, said facilitate zone having a non-bearing contact to said cornea; and
   an alignment zone coupled to the facilitate zone and extending radially therefrom, having an alignment curvature that is flatter than said facilitate curvature.

2. The contact lens of claim 1, further including:
   a peripheral zone coupled to the alignment zone and extending radially therefrom.

3. A contact lens, comprising:
   a base curve portion of the lens having a longer radius of curvature than a central portion of a cornea;
   a fitting curve portion of the lens circumscribing and coupled to the base curve portion, said fitting curve portion being steeper than said base curve portion by about 15–30 diopters;
   a facilitate curve portion of the lens circumscribing and coupled to the fitting curve portion, said facilitate curve portion being flatter than said fitting curve portion, said facilitate curve portion having a non-bearing contact to said cornea; and
   an alignment curve portion of the lens circumscribing and coupled to the facilitate curve portion, said alignment curve portion being flatter than said facilitate curve portion.

4. The contact lens of claim 3, further including:
   a peripheral curve portion of the lens circumscribing and coupled to the alignment curve portion.

5. The contact lens of claim 3, wherein the fitting curve and the base curve have a radius of curvature, and the radius of curvature for the fitting curve is 15–30 diopters steeper than the radius of curvature for the base curve.

6. The contact lens of claim 3, wherein the fitting curve and the facilitate curve have a radius of curvature, and the radius of curvature for the facilitate curve is greater than the radius of curvature for the fitting curve by about 2–25 diopters.

7. A contact lens, comprising:
   a base curve portion of the lens having a longer radius of curvature than a central portion of a cornea;
   a fitting curve portion of the lens circumscribing and coupled to the base curve portion, said fitting curve portion being steeper than said base curve portion by about 15–30 diopters;
   a plurality of facilitate curve portions of the lens circumscribing and coupled to the fitting curve portion, each of said facilitate curve portion being more and more flatter than said fitting curve portion, each of said facilitate curve portions having a non-bearing contact to said cornea; and
   an alignment curve portion of the lens circumscribing and coupled to the facilitate curve portion, said alignment curve portion being flatter than said facilitate curve portions.

8. The contact lens of claim 7, wherein the plurality of facilitate curves comprises two facilitate curves.

9. The contact lens of claim 7, further including:
   a peripheral curve portion of the lens circumscribing and coupled to the alignment curve portion.

10. The contact lens of claim 7, wherein the fitting curve and the base curve have a radius of curvature, and the radius of curvature for the fitting curve is 15–30 diopters steeper than the radius of curvature for the base curve.

11. The contact lens of claim 7, wherein the fitting curve and the facilitate curves have a radius of curvature, and the radius of curvature for the facilitate curves is greater/flatter than the radius of curvature for the fitting curve.

12. A contact lens, comprising:
   an optical zone having a base curvature less than a measured curvature of a central portion of a cornea;
   a fitting zone coupled to the optical zone and extending radially therefrom, the fitting zone defined by two separate fitting curves, a first fitting curve being coupled to said base curvature and being steeper than said base curvature, a second fitting curve being flatter than said first fitting curve by about 2–25 diopters and having a non-bearing contact to said cornea; and
   an alignment zone coupled to the fitting zone and extending radially therefrom, said alignment zone having an alignment curvature that is flatter than said second fitting curve.

13. The contact lens of claim 12, wherein the optical zone defines a base curve, and wherein the two fitting curves comprises a first fitting curve and a second fitting curve, with the first fitting curve and the base curve having a radius of curvature, and the radius of curvature for the first fitting curve being 12–30 diopters steeper than the radius of curvature for the base curve.

14. A method for correcting a myopic condition in a patient's eye, comprising the steps of:

fitting a contact lens to a cornea of a patient's eye, the contact lens comprising:

an optical zone having a base curvature less than a measured curvature of a central portion of a cornea of said patient;

a fitting zone coupled to the optical zone and extending radially therefrom, having a fitting curvature that is steeper than said base curvature by about 15–30 diopters;

a facilitate zone coupled to the fitting zone and extending radially therefrom, having a facilitate curvature that is flatter than said fitting curvature, said facilitate zone having a non-bearing contact to said cornea;

an alignment zone coupled to the facilitate zone and extending radially therefrom, having an alignment curvature that is flatter than said facilitate curvature; and utilizing said facilitate zone to redistribute cornea tissue to cause the cornea to have a flattened central portion surrounded by a steep mid-peripheral ring.

* * * * *